Feb. 7, 1961          H. FEICHTINGER          2,970,350

METHOD OF AND DEVICE FOR THE EVACUATION OF CHILL MOULDS

Filed June 2, 1958

INVENTOR.
HEINRICH FEICHTINGER
BY
Leon M. Strauss
AGT.

United States Patent Office 2,970,350
Patented Feb. 7, 1961

2,970,350
METHOD OF AND DEVICE FOR THE EVACUATION OF CHILL MOULDS

Heinrich Feichtinger, Schaffhausen, Switzerland, assignor to Georg Fischer Aktiengesellschaft, Schaffhausen, Switzerland, a company of Switzerland Filed June 2, 1958, Ser. No. 739,308

Claims priority, application Switzerland June 1, 1957

7 Claims. (Cl. 22—73)

The present invention relates to an apparatus for the evacuation of chill moulds and more particularly to an apparatus for evacuating a chill mould including a mould body and a cover.

The present invention furthermore relates to a specific type of chill mould.

It is an object of the present invention to provide means for facilitating for the effective and complete evacuation of chill moulds in a simple and reliable manner.

A further object of the present invention is to provide for the evacuation of chill moulds comprising a mould body and a cover for closing the mould cavity in the mould body by evacuating the mould cavity prior to the closure thereof by means of the cover.

Another object of the present invention resides in the provision of a chill mould having a novel construction including a mould body having a mould cavity and a cover for closing the mould cavity completely and effectively over an extended period of time when said cover is brought in sealing relation with the mould body subsequently to the evacuation of the mould cavity so that the vacuum in said mould cavity may be maintained until such time when the chill mould is used for the casting operation.

Still a further object of the present invention is the provision of a chill mould having a mould body and a cover arranged to permit when in completely evacuated condition entry of molten metal into the mould cavity when submerging at least a part of said chill mould in the molten metal, while preventing entry of air into said mould cavity prior to such submerging of the chill mould.

Another object of the present invention is the provision of a chill mould including means which when the chill mould is placed or partly submerged in the molten metal will melt therein and provide for a passage of the molten metal into the mould cavity.

It is a further object of the present invention to provide for an apparatus for evacuating chill moulds including a mould body and a cover therefore when the latter are arranged in said apparatus in spaced apart relation so that the mould cavity in the mould body is readily accessible for the evacuation thereof and which will permit the closing of said mould cavity while in evacuated condition in said apparatus.

A further object of the present invention is the provision of means for moving into sealing relation a mould body and a cover therefore when placed in an evacuating chamber of said apparatus subsequently to the mould cavity in the mould body having been evacuated and to provide for the actuation of said means from the exterior of said evacuating chamber to thereby permit closing of the mould cavity without relieving the vacuum therein.

These and further objects of the present invention will become better apparent from the following description when taken in conjunction with the accompanying drawing, in which—

Figure 1:
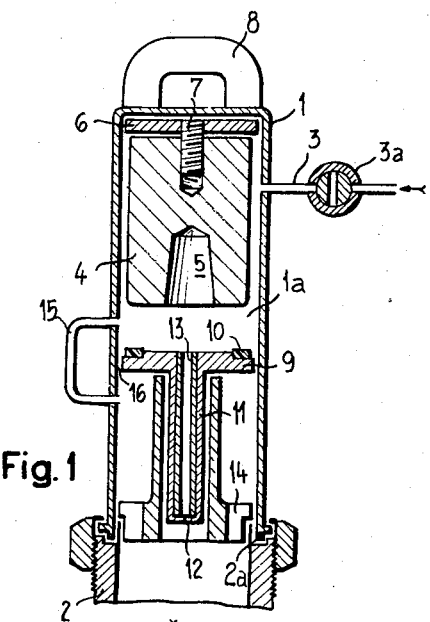
Fig. 1 is a cross-section of the apparatus for evacuating a chill mould.

Referring now to Fig. 1 showing an apparatus for the evacuation of a chill mould, the apparatus includes an evacuable vessel or casing 1 forming an evacuating chamber 1a which communicates with a vacuum pump P via a tubular suction member 2 abutting against a sealing surface 2a of vessel 1. An air supply line 3 includes a valve 3a and enables the vacuum in the chamber 1a to be released, i.e. establishing atmospheric pressure conditions therein in the open position of valve 3a. A mould body 4 provided with a hollow space or mould cavity 5 corresponding to the shape of the body to be cast is arranged within the chamber 1a. An iron plate 6 which is secured to the mould body 4 by means of bolt 7. There is a magnet 8 at the upper end of chamber 1a which acts on the iron plate 6 through the wall of the vessel 1 from the outside thereof, which causes the mould 4 to be held in its initial position. A lid or cover 9 of the mould can be applied to the mould body 4 to close the mould cavity airtight when in sealing relation with the body by means of the sealing ring 10. A tube 11 is tightly and rigidly connected to the lid 9 and closed at its end 12. A quartz tube 13 is inserted in the tube 11 and extends into the lid 9. A supporting member 14 is seated on the upper rim of tubular member 2 and extends into the chamber 1a holding the lid in spaced apart relation with respect to the mould body 4 and centers the lid with respect to the latter.

This device operates as follows: The mould body 4 is first placed in the vessel 1 so that it is held in its initial position shown in Fig. 1 by means of the magnet 8 via the iron plate 6 constituting supporting means for the mould body. The supporting means 14 holds the lid 9 at some distance below the mould body 4 so that the hollow space 5 of the mould 4 is open towards the vacuum pump. In order to enable better evacuation of the hollow space 5, a by-pass 15 may be provided which enables the gases removed to by-pass the constriction 16 formed in the chamber 1a by the lid 9. The vacuum pump P is then set in operation and the chamber 1a evacuated until the desired vacuum is obtained. As soon as a suitable vacuum has been obtained, the magnet 8 may be withdrawn from the vessel so that the mould body 4 is released and drops on lid 9 under the effect of gravity into sealing position, sealing being obtained by means of seal 10 coming into contact with mould body 4. The supply line 3 is then opened to atmospheric pressure by means of valve 3a to release the vacuum in vessel 1. Instead of air, other gases may be introduced into chamber 1a through supply line 3. The gas pressure building up inside the chamber 1a will cause the lid 9 to be forced against the mould body 4 even more tightly. The chill mould is then closed so that it can be removed from the vessel and is then ready for the casting operation proper.

Figure 2:
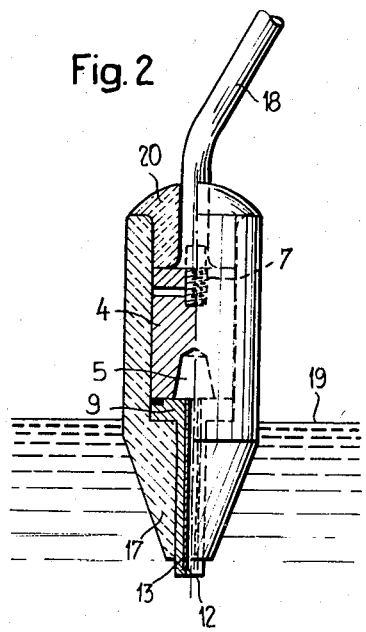
Fig. 2 is a cross-section of the closed chill mould at a moment immediately before melting the metal entry end thereof.

As shown in Fig. 2, the chill mould 4, 9 is for the purpose of casting placed in a jacket 17 consisting of thermally insulating material which resists the action of the melt. Threaded on the bolt 7 from which the plate 6 has previously been removed is a holding rod 18 which enables the chill mould to be immersed in the melt 19 from a certain distance. A sleeve 20 serves to cover the top opening of the jacket 17.

When the mould arranged in the jacket 17 is immersed in molten metal the melt 19 causes the end 12 of the tube 13 to fuse or melt so that the melt 19 is free to enter the hollow space 5. The end 12 may but need not—be formed of the same material as the tube 13; it may consist of a material similar to that in the melt or of some other material. After a few seconds' to a few minutes' immersion, the chill mould and the jacket are withdrawn from the melt. The lid 9 can then be removed and the cast body formed in cavity 5 is ready for further processing, as for instance analysis.

Figure 3:
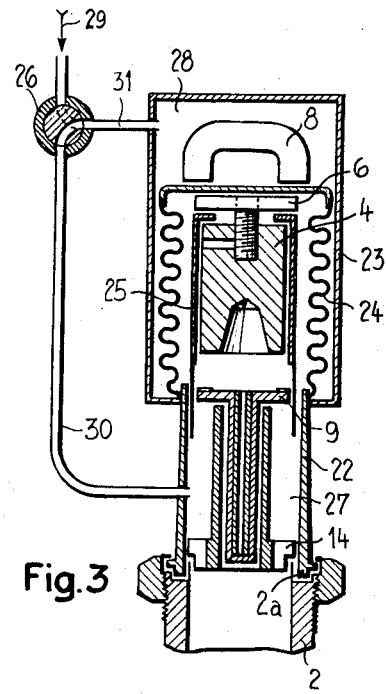
Fig. 3 is a further embodiment of the apparatus according to Fig. 1.

Fig. 3 shows another embodiment of the apparatus according to the invention. In this figure the reference numeral 22 designates the evacuable vessel, i.e. the portion into which the mould body 4 and its lid 9 can be inserted. The vessel 22 is subdivided into two evacuable chambers, the outer chamber 28 being formed by a rigid housing 23 while the inner chamber 27 partly consists of an elastic (tensile) body or bellows 24. The iron plate 6 connected with the chill mould is held at the upper end of chamber 27 by means of magnet 8. A guiding sleeve 25 is designed to guide the lid 9 and the mould body 4 respectively, i.e. to center the two parts of the mould with respect to each other. The guiding sleeve is held in place between mould body 4 and plate 6.

An air supply line 29 communicates over a three-way valve 26 with a connecting pipe 30 and a connecting pipe 31 respectively, the former communicating with chamber 27 while the latter is connected to the chamber 28. By means of the three-way valve 26 the chamber 27 may be connected with chamber 28 or air may be supplied either into the chamber 28 via pipe 31 or into the chamber 27 via pipe 30. The supporting means 14 for the lid 9 is arranged in chamber 27 and seated on the upper rim of the tube 2 connecting chamber 27 with the vacuum pump which has not been shown in Fig. 3.

For evacuation of the apparatus the three-way valve 26 is set so that the chambers 27 and 28 communicate. During evacuation the mould body is held in spaced relation with respect to the lid. As soon as the desired vacuum is reached in chamber 27, the three-way valve is turned so that the chamber 28 is connected with line 29 and will be filled with air via the pipe 31. The line 30 is closed during this stage. The entry of air into the chamber 28 causes the bellows 24 to be compressed so that the mould body 4 is forced into sealing relation with lid 9. Subsequently, air can be passed into chamber 27 via the pipe 30 while the vacuum pump is stopped, so that the plate 6 again returns to its initial position, raising the complete chill mould—mould body and lid—in closed condition. The entire apparatus is lifted off the vacuum pump, i.e. disconnected from tube 2. A slight impact will remove the closed chill mould from the magnet so that the mould is ready for operation as described above.

Figure 4:
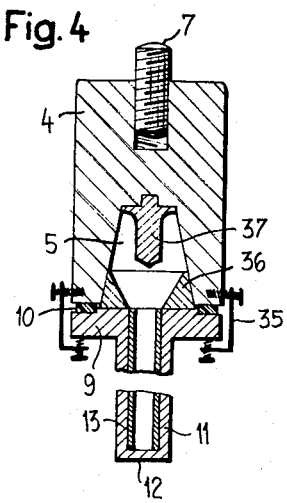
Fig. 4 is a cross-section of a chill mould drawn to a larger scale.

Fig. 4 is a cross-section of the chill mould at an enlarged scale. The mould body 4, which is preferably formed of materials possessing good thermal conductivity, such as copper, is provided with a hollow space or mould cavity 5 which may contain various inserts for the purpose of producing castings of complex configuration. By way of example, a core 37 may be inserted which is formed of a metal or of ceramic material. An insert 36, again formed of metal or a ceramic material, may be provided as well. 13 designates a non-metallic tubular body, e.g. formed of quartz, which is inserted in tube 11 and serves as a lining for the latter so as to prevent melting thereof.

As has been indicated the lid may be secured to the mould body by means of brackets 35 if the chill moulds are to be stored in evacuated condition.

The essential advantages of the present invention are the following: by providing the chill mould with a removable lid, it may rapidly and efficiently be evacuated to maximum vacuum. Evacuation may be performed by means of a diffusion pump, complete degassing being effected not only in the hollow space 5 but in the entire lid and the seal 10. If the seal is slightly greased, the grease is thoroughly freed from gas as well.

The chill mould requires no separate outlet for evacuation, which would have to be protected against the metal flowing into it.

The body cast in the chill mould is particularly suitable as a sample for the performance of analytical gas tests. The mould can be formed so that the sample is given the exact shape required for gas analysis.

The chill mould may be used repeatedly and the mould 4 is subject to practically no wear. Only the tube 11 in the lid must be replaced completely or partly after use. For this reason, it is advantageous to solder the tube 11 into the lid 9 if the latter is to be employed several times.

The chill mould may be formed of metal and/or metal oxides and/or materials having a high thermal stability such as nitrides, carbides, silicides or borides.

The chill mould may be used in a size which corresponds to that shown in the drawing and therefore it may serve to produce samples of extremely small size and quantity.

Having thus particularly described and ascertained the nature of my said invention and in what manner the same is to be performed, I declare that what I claim is:

I claim:

1. Apparatus for evacuating a chill mould having a mould body including a mould cavity and a cover closing said mould cavity airtight when in sealing position with said mould body; comprising a vessel having an evacuating chamber and an open end communicating with said chamber, respective supporting means for said mould body and for said cover in said evacuating chamber and arranged to hold said mould body and said cover in spaced apart position when placed in said evacuating chamber, said supporting means for said mould body being movable in said chamber relative to said supporting means for said cover, said chamber including an elastic bellows, suction means connected to said open end of said vessel for evacuating said chamber and producing a vacuum therein when said mould body and said cover are in said spaced apart position, releasing means operatively associated with said supporting means of said mould body and arranged for operation from the outside of said vessel to release said mould body for movement relative to said cover from said spaced apart position into said sealing position through said supporting means of said mould body, whereby said mould cavity may be closed upon establishing a vacuum therein, and air supply means connected to said chamber for relieving said vacuum therein after said mould cavity has been closed by said cover to thereby permit removal of said chill mould when evacuated from said vessel through said open end thereof.

2. Apparatus for evacuating a chill mould having a mould body including a mould cavity and a cover closing said mould cavity airtight when in sealing position with said mould body; comprising a vessel having an evacuating chamber and an open end communicating with said chamber, respective supporting means for said mould body and for said cover in said evacuating chamber and arranged to hold said mould body and said cover in spaced apart position when placed in said evacuating chamber, said supporting means for said mould body being movable in said chamber relative to said supporting means for said cover, suction means connected to said open end of said vessel for evacuating said chamber and producing a vacuum therein when said mould body and said cover are in spaced apart position, releasing means operatively associated with said supporting means of said mould body and arranged for operation from the outside of said vessel to release said mould body for movement relative to said cover from said spaced apart position into said sealing position through said supporting means of said mould body, whereby said mould cavity may be closed upon establishing a vacuum therein, and air supply means connected to said chamber for relieving said vacuum therein after said mould cavity has been closed by said cover to thereby permit removal of said chill mould when evacuated from said vessel through said open end thereof, said releasing means including magnetic means holding said supporting means in said spaced apart position of said mould body when arranged exteriorly of said vessel and permitting movement of said mould body into said sealing position under the effect of gravity when removed from said vessel.

3. Apparatus for evacuating a chill mould having a mould body including a mould cavity and a cover closing said mould cavity airtight when in sealing relation with said mould body; comprising a vessel having two evacuating chambers and an open end communicating with one of said chambers, a partition member separating said two chambers from each other and movable in said vessel under the influence of a difference of pressure in said two chambers, respective supporting means for said mould body and said cover in said one evacuating chamber and arranged to hold said mould body and said cover in spaced apart relation when placed in said evacuating chamber, said supporting means for said mould body being movably connected to said partition member for movement therewith relative to said supporting means for said cover, suction means connected to said open end of said vessel for evacuating said one chamber and producing a vacuum therein when said mould body and said cover are in said spaced apart relation, moving means operatively associated with said supporting means of said mould body and for said partition member including means for controlling the pressure in the other of said chambers when said one chamber is evacuated to thereby move said mould body relative to said cover from said spaced apart relation into said sealing relation through movement of said partition member and said supporting means of said mould body, whereby said mould cavity may be closed subsequently to producing a vacuum in said one chamber and therewith in said mould cavity, and air supply means connected to said one chamber for relieving said vacuum therein after said mould cavity has been closed by said cover to thereby permit removal of said chill mould when evacuated from said vessel through said open end thereof.

4. Apparatus for evacuating a chill mould having a mould body including a mould cavity and a cover closing said mould cavity airtight when in sealing relation with said mould body; comprising a vessel having an evacuating chamber, respective supporting means for said mould body and said cover in said evacuating chamber and arranged to hold said mould body and said cover in spaced apart relation when placed in said evacuating chamber, suction means connected to said chamber for evacuating the latter and producing a vacuum therein when said mould body and said cover are in said spaced apart relation, further means operatively associated with at least one of said supporting means and arranged for operation from the outside of said vessel to effect movement of said mould body relative to said cover from said spaced apart relation into said sealing relation through said one supporting means, whereby said mould cavity may be closed while a vacuum is maintained therein, an evacuable vessel provided into which the mould body and the lid therefore are separately inserted while a holding device enables one of the two inserted members to be held spaced from the other while evacuating the vessel, a vessel provided with two chambers separated by an elastic partition wall, one chamber accommodating the mould and the lid in spaced relationship while the two chambers have independently actuated connections to a vacuum pump and the outer atmosphere, the elastic partition wall causing the chill mould and the lid to be forced together when the vacuum is released in the space in which the chill mould is placed.

5. A device according to claim 4 characterized by the fact that the elastic partition wall between the two chambers spaced from one another is designed as an elastic tube.

6. An apparatus for evacuating a chill mould having a mould body including a mould cavity and a cover closing said mould cavity airtight when in sealing relation with said mould body; comprising a vessel having an evacuating chamber, means supporting said cover below said mould body in said chamber, an iron plate in said chamber, said mould body being detachably secured to said iron plate, a magnet operatively associated with said iron plate and disposed outside of said vessel for holding said mould body in spaced apart relation with said cover, suction means connected to said chamber for evacuating the latter and producing a vacuum therein when said mould body and said cover are in said spaced apart relation; said magnet being removable from said cover to permit said mould body to fall because of gravity towards said cover from said spaced apart relation into said sealing relation, whereby said mould cavity may be closed while a vacuum is maintained therein.

7. An apparatus according to claim 6 wherein said lid is provided with a tubular inlet for the metal to be sucked into said chill mould, said tubular inlet having a closed end which may be removed by melting.

References Cited in the file of this patent

UNITED STATES PATENTS

| | | |
|---|---|---|
| 1,703,739 | Klepsch | Feb. 26, 1929 |
| 2,210,544 | Galloway | Aug. 6, 1940 |
| 2,379,401 | Poulter | June 26, 1945 |
| 2,485,492 | Hubbard et al. | Oct. 18, 1949 |
| 2,515,060 | Smith | July 11, 1950 |
| 2,685,718 | Schmitz | Aug. 10, 1954 |
| 2,799,066 | Federman et al. | July 16, 1957 |